United States Patent [19]

Wurster et al.

[11] Patent Number: 5,204,880

[45] Date of Patent: Apr. 20, 1993

[54] DIFFERENTIAL LINE DRIVER EMPLOYING PREDISTORTION

[75] Inventors: Stefan M. Wurster, El Dorado Hills; Daniel L. Ray, Fair Oaks, both of Calif.

[73] Assignee: Level One Communications, Inc., Folsom, Calif.

[21] Appl. No.: 690,087

[22] Filed: Apr. 23, 1991

[51] Int. Cl.$^5$ .................................................. H04B 3/00
[52] U.S. Cl. ...................................... 375/36; 330/275
[58] Field of Search ................... 375/7, 36, 121, 59; 330/275, 276, 277; 307/270

[56] References Cited

U.S. PATENT DOCUMENTS

| | | | |
|---|---|---|---|
| 4,437,021 | 3/1984 | Sumi et al. ........................ | 307/270 |
| 4,605,864 | 8/1986 | Varadarajan et al. ............. | 307/270 |
| 4,742,309 | 5/1988 | Chu ................................... | 375/36 |
| 4,803,485 | 2/1989 | Rypinski ........................... | 375/36 |
| 4,964,140 | 10/1990 | Yonekura .......................... | 375/36 |
| 5,077,756 | 12/1991 | Christopheresen ................ | 330/276 |

Primary Examiner—Stephen Chin
Attorney, Agent, or Firm—Merchant, Gould, Smith, Edell, Welter & Schmidt

[57] ABSTRACT

A two terminal line driver employing predistortion is disclosed, for driving data over a lossy transmission line such as a twisted pair cable at speeds on upwards of 10 Mbit/s. The driver is designed for voltage output operation wherein fullstep and halfstep information is actively encoded into a voltage level provided for at the output terminals. The driver provides a fullstep voltage spanning the supply rails and a halfstep voltage having a selectable controlled amplitude of a predetermined value. Fat bits resulting from the biphase encoding format are predistorted by dropping the amplitude to a predetermined value, equalizing the relative power content.

10 Claims, 4 Drawing Sheets

DIFFERENTIAL LINE DRIVER EMPLOYING PREDISTORTION

FIELD OF THE INVENTION

This invention relates generally to a line driver for driving digital signals over a transmission line, and more particularly, to a two terminal differential line driver employing predistortion wherein a frequency change in the data pattern is equalized by dropping the voltage impressed onto the transmission line to an intermediate level.

BACKGROUND OF THE INVENTION

It is known in the art that encoding data in a biphase code, such as the Manchester format, obviates DC biases which occur with encoding formats not contemplating a symmetrical waveform. Manchester coding represents a logic zero by a transition within a baud period from the positive to the negative supply rail and represents a logic one vice versa. In order to maintain the appropriate transition within the baud period, an inherent frequency change occurs in the waveform when adjacent data symbols represent opposite logic values. So long as adjacent data symbols represent all logical ones or zeros, the transmitted waveform has a frequency (f), producing the so-called skinny bits. When adjacent data symbols represent different logic values, the waveform changes to a frequency of (f/2) producing the so-called fat bits.

Lossy transmission lines have an impedance which generally increases with frequency causing the skinny bits to be more severely distorted in comparison with the fat bits. The disparate treatment between skinny and fat bits produces intersymbol interference on the transmission line resulting in data jitter.

It is known in the art that distortion induced by lossy transmission lines can be equalized by predistorting the data, i.e. modifying the magnitude and energy content, before transmission. Predistortion, alternatively called transmit equalization, engenders generating a waveform having discrete levels in between the logic rails. The waveform is driven to an intermediate level between the logic rails at a time in between data bauds, in anticipation of a subsequent logic level change. The relative power content between fat and skinny bits is equalized by truncating the amplitude of fat bits to an intermediate level located between the logic rails.

The Institute of Electrical and Electronic Engineers (IEEE) in proposed supplement P802.3I/D11, incorporated herein by reference, sets forth standards for a local area network (LAN) having a twisted pair cable as its transmission line. The twisted pair network is commonly referred to as a 10Base-T network. The standards set forth include a stringent budget for allowable data jitter induced by the twisted pair cable, necessitating a line driver employing some form of transmit equalization. In the prior art, two approaches for a line driver employing transmit equalization have been contemplated, each have their own inherent disadvantages.

A first approach embodies a line driver configured in a current driving mode having a differential output coupled through a transmit filter to a primary winding of a 1:1 ratio transformer. The primary winding of the transformer includes a center tap coupled to the positive supply rail, which typically is five volts. In this configuration, the transformer acts as both a load for the current driver and an isolating coupler to the transmission line. An example of this type of driver is the ML4653 device produced by Micro Linear Corporation. A serious limitation with this approach is that the current driver must be realized in bipolar technology in order for it to be reliable. Another disadvantage is that the transformer must include a center tap on the primary winding.

A second approach in the prior art which may enjoy the benefits provided for by CMOS technology, is depicted in simple block diagram form in FIG. 1. The line driver is a voltage driving device for driving large capacitive loads comprising noninverting buffers 10 and 12 and inverting buffers 14 and 16. Buffers 10-16 are selectively energized by encoding logic circuitry 18 in response to data received from the LAN attachment unit interface (AUI) 20. Buffers 10 and 16 are externally coupled through a resistor having a low ohmic value (R) and through a transmit filter 22 to a primary winding of a transformer 24. Buffers 12 and 14 are externally wired ORed with buffers 10 and 16 through a resistor having a high ohmic value, typically on the order of ten times R. When energized, buffers 10 and 16 impress a fullstep voltage close to the span of the supply rails across the transmission line. Buffers 12 and 14 when energized, impress a halfstep voltage across the transmission line. Buffers 10 and 16 are selectively energized when encoding logic 18 detects two adjacent data symbols from the AUI 20 of the same value. Likewise, buffers 12 and 14 are energized when encoding logic 18 detects two adjacent data symbols having different values. The external wired ORed approach has the considerable disadvantage in that the transmission function requires dedicating four pins on the integrated circuit package. The larger pin requirement puts the integrated circuit designer in a quandary as to whether to include more pins on the package or to sacrifice some other function to maintain a lower pin count. Examples of such devices include the Am79C98 integrated circuit by Advanced Micro Devices, the T7220 integrated circuit by AT&T and the NCR92C02 integrated circuit by the NCR Corporation.

In accordance with the principals of the present invention, a line driver employing transmit equalization is disclosed which actively encodes fullstep and halfstep information and provides the resulting voltage onto a single pair of output pins. The present invention overcomes limitations in the prior art by providing a two terminal line driver employing predistortion suitable for use in a LAN, such as, but not exclusive to, a 10 Base-T network. The line driver does not require a coupling transformer with a center tap and is realizable in CMOS technology. Further, the present invention requires less die space on an integrated circuit than prior art solutions and the requirement of less pins over prior art solutions allows for additional features to be integrated within the circuit package.

SUMMARY OF THE INVENTION

A line driver employing predistortion having a two terminal output is disclosed, for driving data over a lossy transmission line such as a twisted pair cable, at speeds on upwards of 10 Mbit/s. The driver is designed for voltage output operation wherein fullstep and halfstep information are actively encoded into a voltage level provided for at the two output terminals. The driver provides a fullstep voltage spanning the supply rails and a halfstep voltage having a controlled amplitude of a predetermined value. A fat bit resulting from the biphase encoding format is predistorted by dropping its amplitude to the predetermined value in order to equalize the relative power content.

The line driver comprises a high speed operational amplifier for providing a selectable reference for the halfstep voltage level and differential driving means. The differential driving means drives two feeding resistors in cascade with two transmit filters, terminating in a coupling transformer. The operational amplifier includes removable shorting links in parallel with a resistor ladder. The resistor ladder in combination the removable shorting links yields an adjustable ratiometric resistance providing means for trimming the halfstep voltage level. Differential driver means comprises identical first and second circuits capable of driving a high capacitive load.

For a better understanding of the invention, as well as other objects and further features thereof, reference is made to the following detailed description of the preferred embodiment taken in conjunction with accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part thereof, and in which it is shown by way of illustration a specific embodiment in which the invention may be practiced. It is to be understood that other embodiments may be utilized and structural changes may be made without departing from the scope of the present invention. In the preferred embodiment, a 10 Mbit/s, dual level, twisted pair line driver is disclosed for driving at least one-hundred meters of twisted pair cable having a characteristic impedance of substantially one-hundred ohms. With the benefit of the following disclosure, those skilled in the art will readily recognize that line driver 30 as illustrated in FIG. 2, can be easily adapted for use with other transmission media having different lengths and characteristic impedance.

Figure 1:
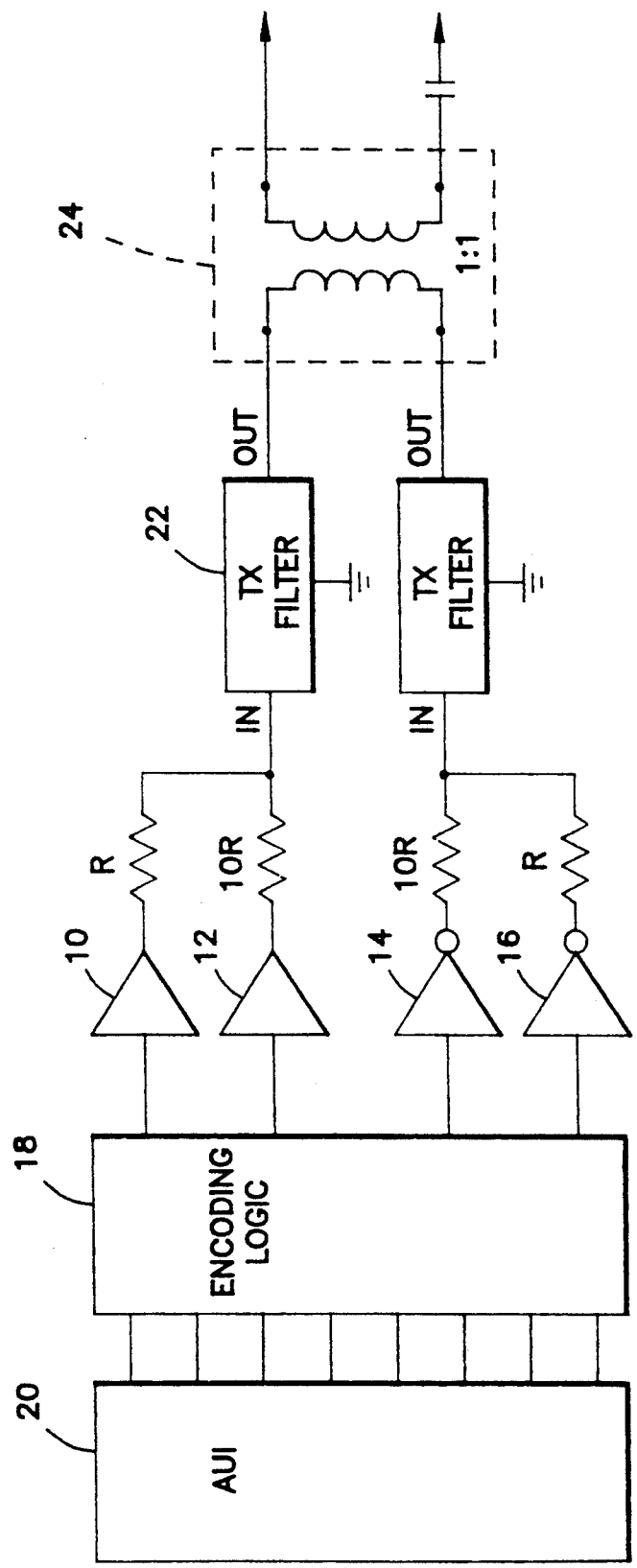
FIG. 1 is a simplified block diagram of a prior art externally wired ORed line driver.
Figure 2:
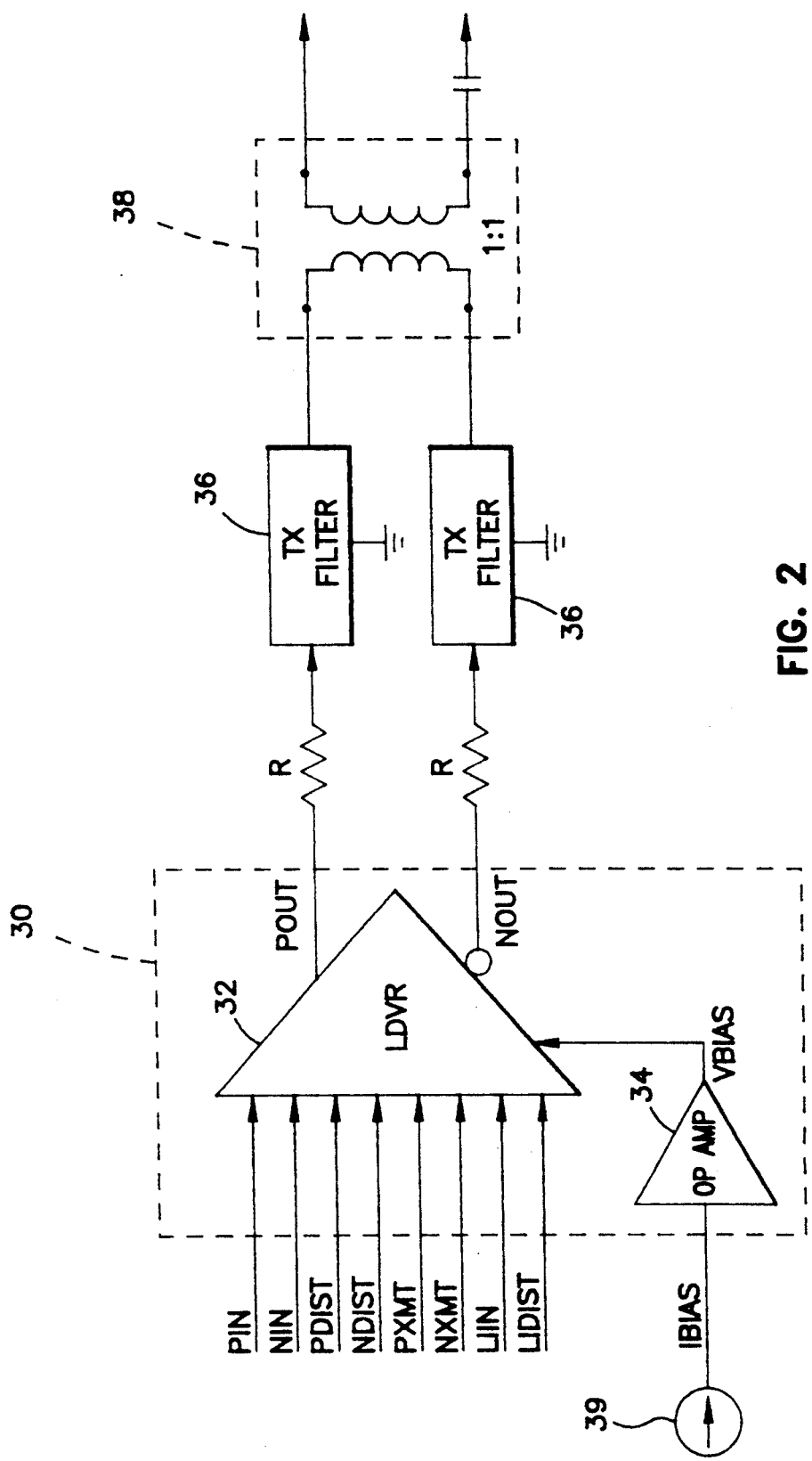
FIG. 2 is a differential line driver in accordance with the principals of the present invention, depicted in simple block form.

Reference is now made to FIG. 2, wherein a differential line driver 30 in accordance with the present invention is depicted in simple block diagram form. Line driver 30 comprises blocks LDVR 32 and OPAMP 34. A differential output on LDVR 30 drives two feeding resistors each having a resistance of substantially fifty ohms. The feeding resistors are cascaded with identical transmit filters 36 for smoothing high order harmonics and are terminated in transformer 38 having a termination impedance of substantially one-hundred ohms. Four pairs of signals, namely (PIN, NIN), (PDIST, NDIST), (PXMT, NXMT) and (LIIN, LIDIST), control LDVR 32. Input signals (PIN, NIN) are received from an output of a LAN attachment unit interface (AUI) transmit receiver. In accordance with standards set forth in proposed IEEE supplement P802.3I/D11, the AUI transmit receiver, (not shown) receives signals from the DO circuit of a remotely located AUI transceiver (not shown). Among other functions, the AUI transmit receiver receives, conditions and level shifts signals to the appropriate logic level for LDVR 30. Signals (PDIST, NDIST) are signals (PIN, NIN) delayed by a predetermined length of time. Signals (PXMT, NXMT) are external input signals which separately enable the positive (P) side and negative (N) side of LDVR 30, respectively. In accordance with standards set forth in proposed IEEE supplement P802.3I/D11, external circuitry (not shown) detects end of frame and transmission link integrity and generates signal LIIN in response thereto. Signal LIDIST for simplicity sake, is signal LIIN delayed by a predetermined time. Current source 39 provides a predetermined and constant current (IBIAS) for OPAMP 34.

Figure 3:
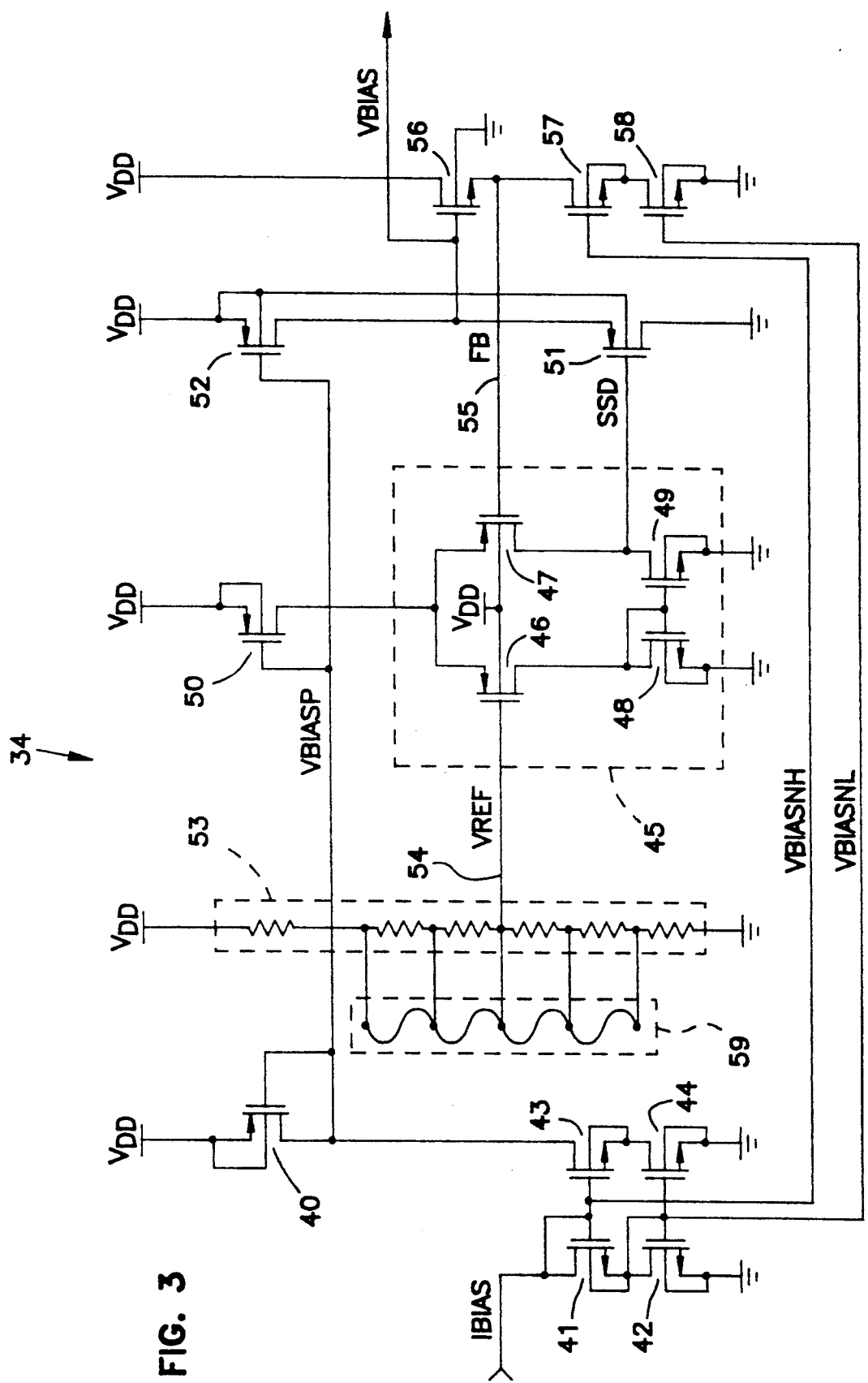
FIG. 3 is a schematic diagram of the operational amplifier block (OPAMP) as depicted in FIG. 2.

Referring now to FIG. 3, wherein OPAMP 34 is schematically illustrated in more detail. Constant current IBIAS is converted into bias voltages VBIASP, VBIASNH and VBIASNL by transistor 40 in combination with transistors 41–44. OPAMP 34 includes a differential input stage 45 comprising PMOS transistors 46 and 47 complimentary coupled to NMOS transistors 48 and 49. The complimentary arrangement is substantially biased at 200 uA by a current source comprising transistor 50 in combination with bias voltage VBIASP. The positive input 54 of differential input stage 45 is coupled to a tap on a resistor ladder 53 in parallel with removable shorting links 59. The ratiometric resistance of resistive ladder 53 is adjustable by selectively removing shorting links 59. Resistor ladder 53 in combination with shorting link 59, provide a selectable but constant reference voltage (VREF) for positive input 54. PMOS transistor 51 is configured as a source follower having its source coupled to the gate of NMOS transistor 56 and having its gate coupled to the junction of the drains of transistors 47 and 49. Transistor 51 is substantially biased at 2.5 mA by a current source comprising transistor 52 in combination with bias voltage VBIASP. NMOS transistor 56 is substantially biased at 500 uA by a current source comprising cascaded transistors 57 and 58 in combination with bias voltages VBIASNH and VBIASL. Transistor 56 has its source coupled back in a feedback fashion to the negative input 55 of differential input stage 45. The source voltage of transistor 56 forces negative input 55 to a voltage substantially equal to that applied to at positive input 54, namely VREF. The gate voltage of transistor 56 (VBIAS) is coupled to LDVR 32 providing a reference for the halfstep level. The halfstep reference level is trimmed by selectively removing shorting links 59 to compensate for different transmit filters types as well as for impedance mismatches between transistors within the line driver 30.

Figure 4:
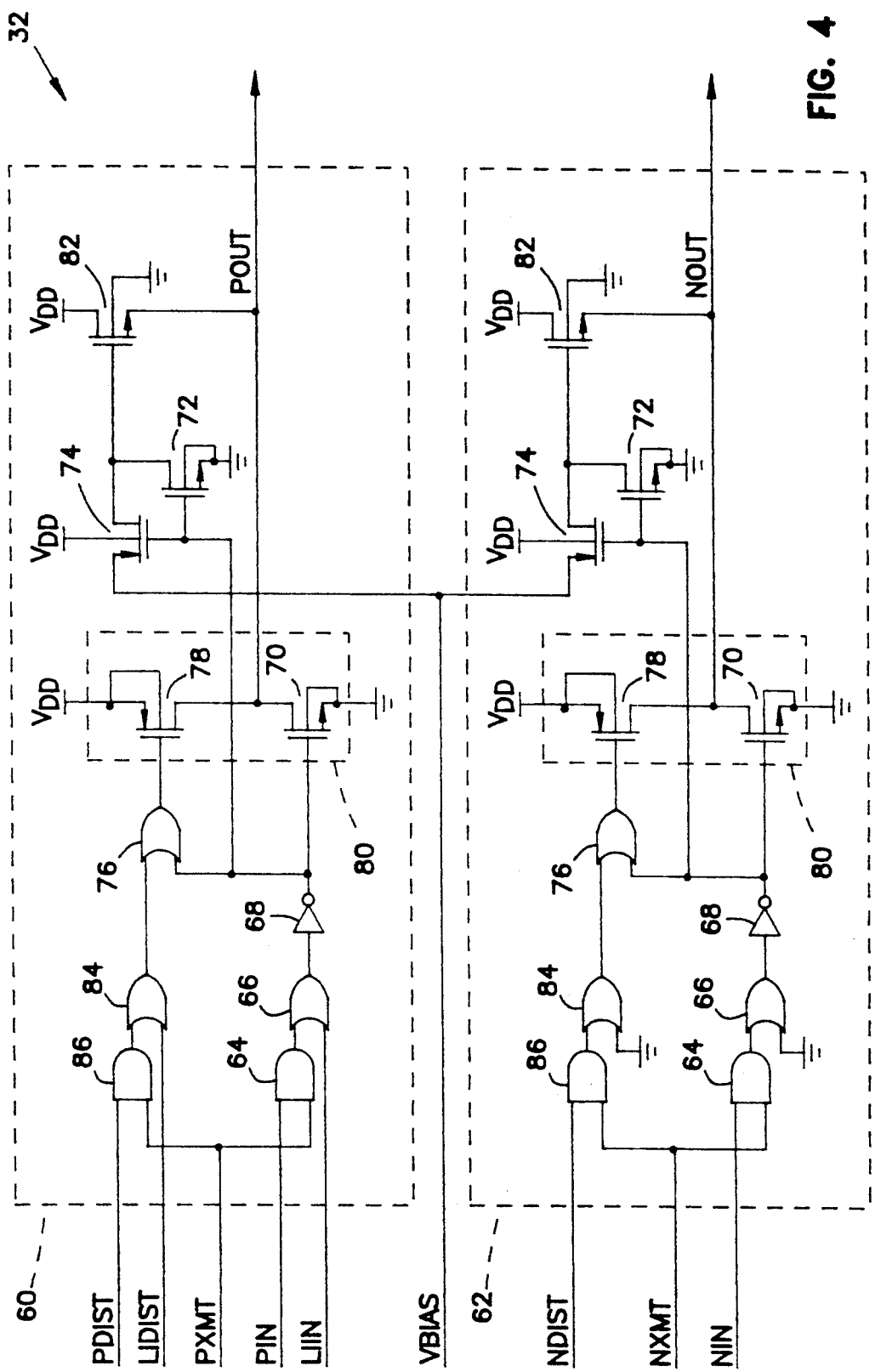
FIG. 4 is a schematic diagram of the driver block (LDVR) as depicted in FIG. 2.

LDVR 32, described in its simplest form, comprises two identical circuits capable of driving a high capacitive differential load. In a balanced fashion, the circuits drive the primary winding of the 1:1 transmit transformer 38 through first and second resistors (R) which insert a 6 dB loss, and through first and second transmit filters 36. Reference is now made to FIG. 4, wherein LDVR 32 is schematically illustrated. Since the structural description of circuits 60 and 62 is identical, only circuit 60 is described with respect to signals PXMT, PIN, PDIST, LIIN and LIDIST. Circuit 62 operates in an identical fashion except signal inputs are NXMT, NIN and NDIST and signal inputs for LIIN and LIDIST are permanently tied to a logic zero. Differential input signals PIN and NIN are by nature inverse to each other causing circuits 60 and 62 to operate mutually exclusive of one another.

Circuit 60 in FIG. 4 comprises AND gate 64 having a first input coupled to signal PIN and a second input coupled to PXMT. The output of AND gate 64 tracks the value of PIN when PXMT is asserted to a logic one and is forced to a logic zero when PXMT is asserted to a logic zero. The output of AND gate 64 is logically ORed with signal LIIN in OR gate 66. The output of OR gate 66 is inverted by inverter 68. The output of inverter 68 is coupled to the gates of transistors 70, 72 and 74, and to a first input of OR gate 76. A second input to OR gate 76 is coupled to the output of OR gate 84. A first input to OR gate 84 is coupled to the input signal LIDIST. A second input to OR gate 84 is coupled to the output of AND gate 86 which logically ANDs signal PDIST with enable signal PXMT. The output of OR gate 76 drives the gate of PMOS transistor 78, which in combination with NMOS transistor 70, form CMOS inverter 80. OR gate 76 forces the gate of transistor 78 to a logic one, effectively shutting it off when either LIDIST or the combination of PXMT and PDIST equal a logic one or LIIN equals a logic zero and either PXMT or PIN equals a logic zero. The drains of transistors 72 and 74 are coupled together with the gate of NMOS transistor 82. The source of transistor 74 is coupled to bias voltage VBIAS on the gate of transistor 56 in OPAMP 34. The source of transistor 82 is coupled to the drains of complimentary pair 80 which forms output POUT.

FULLSTEP OPERATION

As long as input signals PDIST and LIDIST remain a logical zero, complimentary pair 80 operates as a normal inverter. The same is true in circuit 62 except only signal NDIST needs to be asserted to zero. For example, if PIN is asserted to one, the output of inverter 68 is zero, turning on transistors 74 and 78, pulling POUT to a voltage equal to the positive supply rail less the drop across transistor 78. Likewise in circuit 62, NIN will be zero causing the output of inverter 68 to be one, turning on transistor 70 and pulling NOUT to the negative supply rail less the drop across transistor 70.

HALFSTEP OPERATION

Assuming PIN is asserted to one, the output of inverter 68 turns transistor 70 off and transistor 74 on. The output of OR gate 76 being low turns on transistor 78, pulling POUT close to the positive supply rail. As soon as one of the signals of LIDIST or the combination of PDIST with PXMT is asserted to one, the output of OR gate 76 turns transistor 78 off. Transistor 74 still energized by inverter 68, impresses a voltage substantially equal to VBIAS onto POUT through transistor 82.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A differential line driver, powered between voltage supply rails, for driving a transmission line with predistorted data, comprising:
   a) a plurality of input terminals for receiving input signals containing data symbols, the input terminals being coupled to logic means for selecting a fullstep output voltage level in response to identical adjacent data symbols and for selecting a halfstep output voltage level in response to different adjacent data symbols, the fullstep output voltage level substantially spanning the supply rails and the halfstep output voltage level having a selectable value between the supply rails;
   b) differential driving means, having an input coupled to the logic means and responsive thereto and having a first and a second output terminal coupled to the transmission line, for impressing the halfstep and fullstep output voltage levels on the transmission line; and
   c) means, coupled to the differential driving means, for setting the halfstep output voltage level.

2. The line driver in accordance with claim 1, wherein a fixed voltage in combination with a resistive ladder being in parallel with a plurality of shorting links provides an adjustable ratiometric voltage for adjusting the halfstep output voltage level.

3. A line driver in a local area network comprising:
   a) input means for receiving data from an attachment unit interface (AUI) transmit receiver;
   b) means, coupled to the input means, for impressing a differential output voltage across a two terminal transformer, the output voltage substantially spanning from an upper logic rail to a lower logic rail;
   c) means for establishing a predetermined halfstep value; and
   d) means, coupled to the inputs means and responsive thereto, for detecting adjacent data bits having opposite values and for reducing the output voltage to the predetermined halfstep value.

4. The line driver in accordance with claim 3, wherein the means for establishing a predetermined halfstep value includes a constant current source and an operational amplifier comprising:
   a complimentary differential input stage having a positive input coupled to a tap on a resistor ladder, the resistor ladder being coupled in parallel with a plurality of removable shorting links, the resistor ladder providing an adjustable ratiometric resistance by selectively removing the shorting links and in combination with a fixed voltage, providing a selectable reference voltage for the positive input; and
   a PMOS transistor configured as a source follower having its source coupled to a gate of a first NMOS transistor and the PMOS transistor having its gate coupled to the output of the complimentary differential input stage, the first NMOS transistor having its source coupled back to a negative input of the differential input stage, wherein a voltage on the source of the first NMOS transistor maintains the predetermined halfstep value and the gate of the first NMOS transistor is coupled to a second NMOS transistor for providing the predetermined halfstep voltage value at an increased current.

5. The line driver in accordance with claim 3 wherein the means for impressing a differential output voltage across a two terminal transformer comprises:

a first and a second circuit capable of driving a large capacitive differential load in a balanced fashion, the circuits driving a primary winding of the transformer through a first and a second resistor to insert a 6 dB loss and through a first and a second transmit filter for suppressing electromagnetic radiation.

6. The line driver in accordance with claim 5, wherein the first and second circuits further comprise:

first logic circuit means having a first input being coupled to a data input signal, a second input being coupled to an enable signal, a third input being coupled to a link integrity signal, and an output being coupled to a first input of an OR gate, to a gate of a first and a second NMOS transistor and to a gate of a first PMOS transistor, the first PMOS transistor having a source coupled to a predetermined halfstep voltage level;

second logic circuit means having a first input being coupled to the data input signal delayed by a predetermined length of time, a second input being coupled to the enable signal, a third input being coupled to the link integrity signal delayed by a predetermined length of time, and an output being coupled to a second input of the OR gate, the OR gate having an output being coupled to a gate of a second PMOS transistor which in combination with first NMOS transistor, form a complimentary pair with its commonly coupled drains providing an output; and a third NMOS transistor having its source coupled to the commonly coupled drains of the complimentary pair and its gate coupled to a drain of the first PMOS transistor and a drain of the second NMOS transistor.

7. In a line driver having a single pair of output terminals, a method for differentially driving predistorted data onto a transmission line comprising the steps of:
a) receiving data symbols;
b) selecting a fullstep output voltage level in response to receiving identical adjacent data symbols and selecting a halfstep output voltage level in response to receiving different adjacent data symbols; and
c) differentially impressing the halfstep and the fullstep output voltage levels across the single pair of output terminals on to the transmission line.

8. A method for adjusting the halfstep voltage in claim 7, comprising the steps of:
a) applying a fixed voltage to a resistive ladder being in parallel with a plurality of shorting links;
b) tapping the resistive ladder for a halfstep voltage level; and
c) removing individual shorting links until the halfstep voltage reaches a desired level.

9. A method for driving a local area network comprising the steps of:
a) receiving data from an attachment unit interface (AUI) transmit receiver;
b) impressing a differential output voltage across a two terminal transformer, the output voltage substantially spanning from an upper logic rail to a lower logic rail;
c) establishing a predetermined halfstep value; and
d) detecting adjacent data bits having opposite values and for reducing the output voltage to the predetermined halfstep value.

10. The method in accordance with claim 9, wherein the step of establishing a predetermined halfstep value includes a constant current source and an operational amplifier further comprising the steps of:
applying a reference voltage to a positive input of a differential input of the operational amplifier;
adjusting the reference voltage by changing a ratiometric resistance of a resistor ladder being in parallel with a plurality of shorting links by removing individual shorting links; and
feeding back an output signal from the operational amplifier to a negative input of the differential input to force the output to a predetermined halfstep value.

* * * * *

UNITED STATES PATENT AND TRADEMARK OFFICE
CERTIFICATE OF CORRECTION

PATENT NO. : 5,204,880
DATED : April 20, 1993
INVENTOR(S) : Stefan M. Wurster et al.

It is certified that error appears in the above-identified patent and that said Letters Patent is hereby corrected as shown below:

Column 2, line 9, delete the comma (",") after "technology"; and line 43, "principals" should read --principles--. Column 3, line 12, insert --with-- after "combination"; and line 31, "principals" should read --principles--. Column 4, lines 27 and 28, "complimentary" should read --complementary--. Column 5, line 33, "complimentary" should read --complementary--; line 38, "complimentary" should read --complementary--; and line 57, strike the comma (",") after "68". Column 6, line 45, "complimentary" should read --complementary--; and line 57, "complimentary" should read --complementary--. Column 7, line 28, "complimentary" should read --complementary--; and lines 32 and 33, "complimentary" should read --complementary--.

Signed and Sealed this

Eighth Day of March, 1994

Attest:

BRUCE LEHMAN

Attesting Officer        Commissioner of Patents and Trademarks